(12) United States Patent
Gong et al.

(10) Patent No.: US 11,031,860 B2
(45) Date of Patent: Jun. 8, 2021

(54) INRUSH CURRENT CONTROL DURING STARTING OF RESONANT CONVERTERS

(71) Applicant: Murata Manufacturing Co., Ltd., Nagaokakyo (JP)

(72) Inventors: Bing Gong, Etobicoke (CA); Jahangir Afsharian, Toronto (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 701 days.

(21) Appl. No.: 14/650,632

(22) PCT Filed: Jan. 22, 2014

(86) PCT No.: PCT/US2014/012450
§ 371 (c)(1),
(2) Date: Jun. 9, 2015

(87) PCT Pub. No.: WO2014/116641
PCT Pub. Date: Jul. 31, 2014

(65) Prior Publication Data
US 2015/0318778 A1 Nov. 5, 2015

Related U.S. Application Data

(60) Provisional application No. 61/756,036, filed on Jan. 24, 2013.

(51) Int. Cl.
*H02M 1/36* (2007.01)
*H02M 3/335* (2006.01)
*H02M 3/337* (2006.01)

(52) U.S. Cl.
CPC ............ *H02M 1/36* (2013.01); *H02M 3/3376* (2013.01); *H02M 3/33546* (2013.01); *Y02B 70/10* (2013.01); *Y02P 80/10* (2015.11)

(58) Field of Classification Search
CPC .. H02M 1/36; H02M 3/33546; H02M 3/3376; Y02B 70/1433
See application file for complete search history.

(56) References Cited

U.S. PATENT DOCUMENTS

| 5,321,235 A * | 6/1994 | Makino | H05B 6/6432 |
| | | | 219/716 |
| 5,644,479 A * | 7/1997 | Yoshida | H02M 3/33569 |
| | | | 363/131 |

(Continued)

OTHER PUBLICATIONS

Official Communication issued in International Patent Application No. PCT/US2014/012450, dated May 7, 2014.

*Primary Examiner* — Thienvu V Tran
*Assistant Examiner* — Bart Iliya
(74) *Attorney, Agent, or Firm* — Keating & Bennett, LLP

(57) ABSTRACT

A converter with soft start includes a transformer; first and second switches connected to the transformer to supply power to the transformer; a controller connected to the first and second transistors and arranged to, during startup of the converter, switch the first switch with a variable duty cycle and switch the second switch with either a fixed duty cycle or a variable duty cycle with pulses larger than pulses of the variable duty cycle of the first switch; and a bleed device arranged to set initial conditions of the converter before startup of the converter by discharging a capacitor in the converter before startup.

17 Claims, 8 Drawing Sheets

(56) References Cited

U.S. PATENT DOCUMENTS

| | | | | |
|---|---|---|---|---|
| 6,091,610 A | * | 7/2000 | Garcia | H02M 1/36 |
| | | | | 363/17 |
| 6,330,170 B1 | * | 12/2001 | Wang | H02M 3/33584 |
| | | | | 363/17 |
| 6,498,617 B1 | * | 12/2002 | Ishida | G06K 15/1209 |
| | | | | 347/240 |
| 6,760,235 B2 | * | 7/2004 | Lin | H02M 1/36 |
| | | | | 363/21.06 |
| 2009/0046482 A1 | * | 2/2009 | Smith | H02M 3/33569 |
| | | | | 363/17 |
| 2009/0310387 A1 | | 12/2009 | Lu | |
| 2009/0316442 A1 | | 12/2009 | Elferich | |
| 2010/0259951 A1 | * | 10/2010 | Adragna | H02M 3/337 |
| | | | | 363/17 |
| 2010/0259954 A1 | * | 10/2010 | Santoro | H02M 1/36 |
| | | | | 363/21.02 |
| 2011/0164437 A1 | | 7/2011 | Sun et al. | |
| 2011/0188269 A1 | * | 8/2011 | Hosotani | H02M 3/33592 |
| | | | | 363/21.06 |
| 2011/0317452 A1 | * | 12/2011 | Anguelov | H02M 3/33584 |
| | | | | 363/17 |
| 2012/0044721 A1 | | 2/2012 | Liang et al. | |
| 2012/0126765 A1 | * | 5/2012 | Stone | H02M 1/36 |
| | | | | 323/283 |
| 2012/0230059 A1 | * | 9/2012 | Adragna | H02M 3/3376 |
| | | | | 363/16 |
| 2012/0294045 A1 | | 11/2012 | Fornage et al. | |
| 2012/0299503 A1 | * | 11/2012 | Aharon | H02M 3/3353 |
| | | | | 315/224 |
| 2013/0229829 A1 | * | 9/2013 | Zhang | H02M 3/33569 |
| | | | | 363/16 |

* cited by examiner

INRUSH CURRENT CONTROL DURING STARTING OF RESONANT CONVERTERS

BACKGROUND OF THE INVENTION

1. Field of the Invention

The present invention relates to DC/DC converters. More specifically, the present invention relates to soft-start control schemes for resonant DC/DC converters.

2. Description of the Related Art

Known soft-start control schemes with high-side switch Pulse Width Modulation (PWM) control, low-side switch PWM control, or any other asymmetrical PWM control for resonant DC-to-DC converters (e.g., an LLC or an LLCLL resonant converter) requires consideration of the initial conditions in the resonant converter prior to startup. For example, if high-side switch PMW control is used (i.e., the high-side switch operates at a variable duty cycle while the low-side switch operates at a full duty cycle), inrush current will be determined by the initial voltage across the low-side switch. The higher this initial voltage is, the larger the inrush current will be.

A large inrush current can cause one or more of the following problems during startup of a resonant converter:
1) A high initial voltage can cause an over-voltage transient in the input capacitors (i.e., resonant capacitors) of a resonant converter, which can decrease the lifetime of the input capacitors.
2) A large inrush current can decrease the lifetime of the input switches (i.e., primary-side switches) of a resonant converter.
3) A large inrush current can also saturate the resonant inductor of a resonant converter. The inrush current can then further increase due to the resonant inductor being saturated.
4) A large inrush current can cause oscillations (e.g., a large ripple voltage) to appear at the output of the resonant converter during an initial stage of soft starting the resonant converter.

Sun et al. (U.S. Pat. No. 8,018,740) teaches operating an LLC resonant converter in a fixed-frequency and variable-pulse duty cycle operation mode during startup of the LLC resonant converter. Sun et al.'s LLC resonant converter switches to a variable-frequency and fixed-pulse duty cycle operation mode once startup is completed (e.g., when a predetermined voltage is reached at a load connected to the output of the LLC resonant converter). That is, during startup, Sun et al.'s LLC resonant converter operates in a PWM mode such that only the duty cycle is controlled and the frequency of the LLC resonant converter remains fixed and then switches to a Pulse Frequency Modulation (PFM) mode after startup.

Accordingly, one of the drawbacks with Sun et al.'s control scheme is that the implementation of this scheme using commercially available control integrated circuits (ICs) for LLC resonant converters is difficult because conventional control ICs for LLC resonant converters typically do not include a variable-pulse duty cycle capability. Thus, although this scheme can effectively limit inrush current in the LLC resonant converter, an external circuit is needed to control both high-side and low-side switches to operate at a variable pulse duty cycle. Such an external circuit requires a complex implementation to meet isolation requirements for the high-side switch. Another drawback of Sun et al.'s control scheme is a loss of soft switching during startup, which necessitates special considerations for gate drive design.

Feng et al. ("Optimal Trajectory Control of Resonant LLC Converter for Soft Start-Up") teaches a control scheme for an LLC resonant converter that uses an asymmetrical current limitation band to settle initial voltage and current levels. Because a startup current in Feng et al. is controlled within the asymmetrical current limitation band, no inrush current exists during startup. Accordingly, one of the drawbacks of Feng et al.'s control scheme is that a resonant current measurement circuit is needed to implement the unsymmetrical current limitation band, which increases the overall cost of a system that includes Feng et al.'s control scheme. Another drawback of Feng et al.'s control scheme is that this control scheme is only applicable for half-bridge LLC resonant converter with a single resonant capacitor, as shown in FIG. 1, and not to a half-bridge LLC resonant converter with split resonant capacitors.

SUMMARY OF THE INVENTION

To overcome the problems described above, preferred embodiments of the present invention provide a soft-start control scheme for variable-frequency resonant converters for overcoming the above-described problems that occur during startup of conventional resonant converters. The soft-start control scheme according to the preferred embodiments of the present invention limit inrush current and reduce transient over-voltages by using a bleed device and performing variable duty cycle control for one switch (either high-side or low-side) to set the initial conditions of the resonant converter, which preferably includes setting a capacitor's voltage to zero or near zero, before startup of the resonant converter. If the bleed device is a bleed resistor, then the bleed resistor R preferably has a very large resistance and thus has a negligible effect on normal operation of the resonant converter.

A converter with soft start according to a preferred embodiment of the present invention includes a transformer; first and second switches connected to the transformer to supply power to the transformer; a controller connected to the first and second transistors and arranged to, during startup of the converter, switch the first switch with a variable duty cycle and switch the second switch with either a fixed duty cycle or a variable duty cycle with pulses larger than pulses of the variable duty cycle of the first switch; and a bleed device arranged to set initial conditions of the converter before startup of the converter by discharging a capacitor in the converter before startup.

The bleed device is preferably connected in parallel with the second switch.

Preferably, either:
1) the first switch is a high-side switch and the second switch is a low-side switch; or
2) the first switch is a low-side switch and the second switch is a high-side switch.

The converter further preferably includes first and second capacitors connected in series, where the first capacitor is preferably connected to the first transistor and where the second capacitor is preferably connected to the second transistor. Preferably, the bleed device is connected in parallel with the second capacitor, and the second capacitor is the capacitor in the converter discharged by the bleed device before startup.

Preferably, either:
1) the first switch is a high-side switch;
2) the second switch is a low-side switch;
3) the first capacitor is a high-side capacitor; and
4) the second capacitor is a low-side capacitor;
or
1) the first switch is a low-side switch;
2) the second switch is a high-side switch;
3) the first capacitor is a low-side capacitor; and
4) the second capacitor is a high-side capacitor.

The bleed device preferably discharges the capacitor in the converter before startup to zero or nearly zero. The converter further preferably includes a resonant inductor. Preferably, the resonant inductor is either a discrete inductor or a leakage inductance of the transformer. Preferably, the bleed device includes either a resistor or a switch. The converter preferably is a resonant converter. The switching of the first switch preferably is center-aligned, left-aligned, or right-aligned.

A soft-start method for a converter according to a preferred embodiment of the present invention includes the steps of providing a converter that includes a transformer and first and second switches connected to the transformer to supply power to the transformer; before startup of the converter, setting initial conditions of the converter by discharging a capacitor in the converter before startup; and during startup of the converter, switching the first switch with a variable duty cycle and switching the second switch with either a fixed duty cycle or a variable duty cycle with pulses larger than pulses of the variable duty cycle of the first switch.

The setting initial conditions step preferably is performed using a bleed device connected in parallel with the second switch.

The converter further preferably includes first and second capacitors connected in series, where the first capacitor is preferably connected to the first transistor and where the second capacitor is preferably connected to the second transistor, and the setting initial conditions step is performed using a bleed device connected in parallel with the second capacitor.

The discharging of the capacitor in the converter before startup preferably discharges the capacitor to zero or nearly zero. The converter is preferably a resonant converter.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

FIG. 7A shows a center aligned duty cycle, FIG. 7B shows a left-aligned duty cycle, and FIG. 7C shows a right-aligned duty cycle.

FIG. 10A shows a center aligned duty cycle, FIG. 10B shows a left-aligned duty cycle, and FIG. 10C shows a right-aligned duty cycle.

DETAILED DESCRIPTION OF PREFERRED EMBODIMENTS

Figure 1:
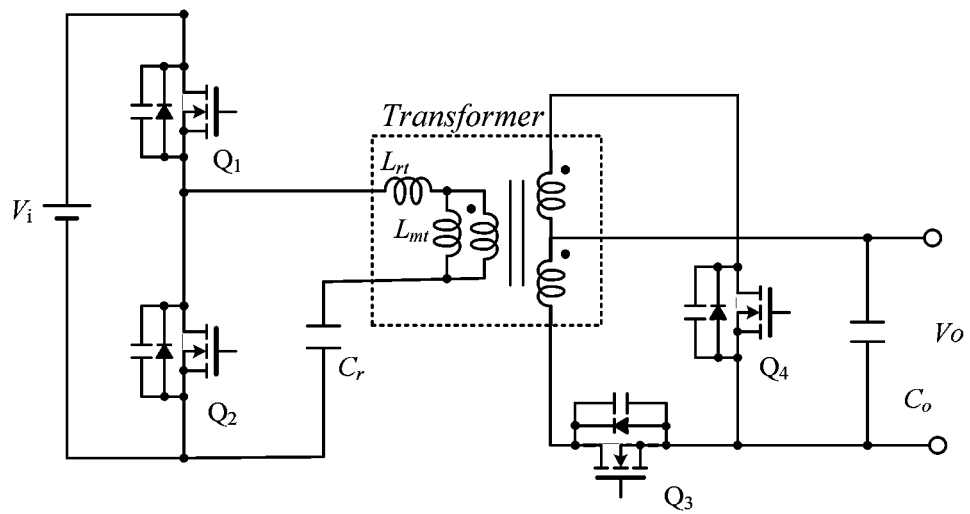
FIG. 1 is a circuit diagram of a conventional half-bridge LLC resonant converter with single resonant capacitor $C_r$.
Figure 2:
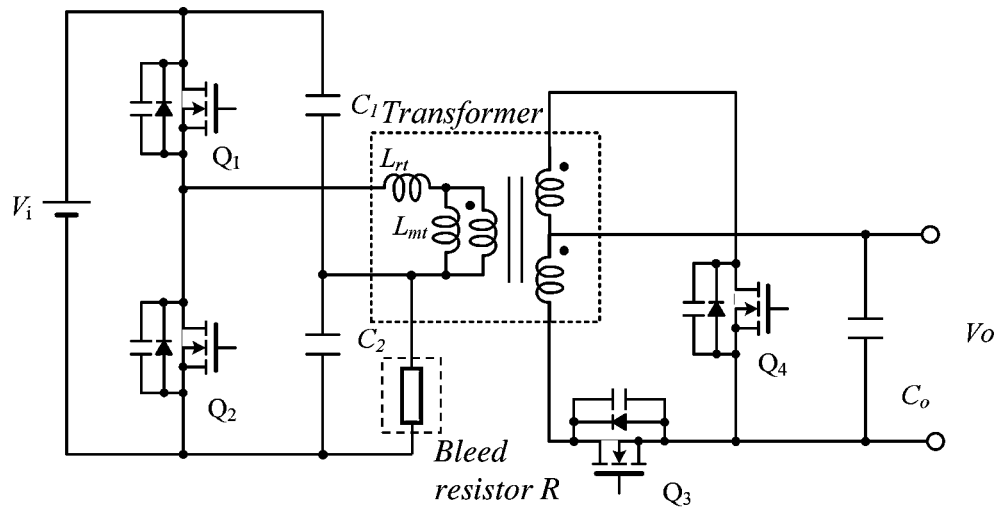
FIG. 2 is a circuit diagram of symmetric half-bridge LLC resonant converter with added bleed resistor R.

FIG. 2 is a schematic diagram of an example of an LLC resonant converter according to a preferred embodiment of the present invention. The LLC resonant converter shown in FIG. 2 is a half-bridge LLC resonant converter that preferably includes at least one high-side switch Q1 and at least one low-side switch Q2. Preferably, the high-side switch Q1 and the low-side switch Q2 are metal-oxide-semiconductor field-effect transistors (MOSFETs). Further, the LLC resonant converter shown in FIG. 2 preferably includes a high-side resonant capacitor C1 and a low-side resonant capacitor C2 connected in series, a resonant inductor Lrt, a magnetizing inductor Lmt, and a transformer. The high-side resonant capacitor C1 and the low-side resonant capacitor C2 are preferably split resonant capacitors. In particular, split resonant capacitors C1 and C2 can be used in medium-power and high-power applications to help reduce the input current ripple.

The resonant inductor can be a discrete inductor as shown, for example, in FIGS. 5, 6, 8, and 9 as resonant inductor Lre or can be created by the leakage inductance of the transformer as shown, for example, in FIGS. 2, 5, 6, 8, and 9 as resonant inductor Lrt. The magnetizing inductor can be a discrete inductor as shown, for example, in FIGS. 5, 6, 8, and 9 as magnetizing inductor Lme or can be created by the magnetizing inductance of the transformer as shown, for example, in FIGS. 2, 5, 6, 8, and 9 as magnetizing inductor Lmt. Further, the resonant and magnetizing inductors can each include both discrete inductors and leakage inductors as shown, for example, in FIGS. 5, 6, 8, and 9. Secondary switches Q3 and Q4, together with the output capacitor Co, preferably define a secondary-side synchronous rectification circuit of the LLC resonant converter shown in FIG. 2. It is possible to used diode rectifiers instead of secondary switches Q3 and Q4.

In the preferred embodiment shown in FIG. 2, the switching of the high-side switch Q1 is controlled with a variable duty cycle, while the switching of the low-side switch Q2 is controlled with a full duty cycle. In other words, only the high-side switch Q1 is in PWM mode during startup of the LLC resonant converter.

A bleed resistor R is connected in parallel with the low-side resonant capacitor C2. Accordingly, the initial voltage across the low-side switch Q2 and the low-side resonant capacitor C2 is nearly zero before startup of the resonant converter. Because the bleed resistor R preferably has a large resistance, the bleed resistor R may not completely discharge the low-side resonant capacitor C2; however, the bleed resistor R can discharge the low-side resonant capacitor C2 to an acceptable low voltage.

When the low-side switch Q2 is turned on with a full duty cycle at startup, no large inrush current spike is generated because the voltage applied to the resonant inductor Lrt is small because the small initial voltage on the low-side resonant capacitor C2. When the high-side switch Q1 is turned on, the voltage applied to the resonant inductor Lrt is close to the input voltage Vi which causes a rapid increase in current. However, the high-side switch Q1 is PWM controlled such that the current can be easily controlled to be an acceptable level by changing the duty cycle of the high-side switch Q1. Thus, by properly setting initial conditions before the startup of the resonant converter, inrush current can be avoided.

The transient over-voltage problem on the high-side resonant capacitor C1 and the low-side resonant capacitor C2 can also be eliminated because the inrush current is limited by this control scheme. In addition, a smooth soft-start can be achieved, and oscillations during the initial stage of the soft start can be significantly reduced and prevented.

Figure 3:
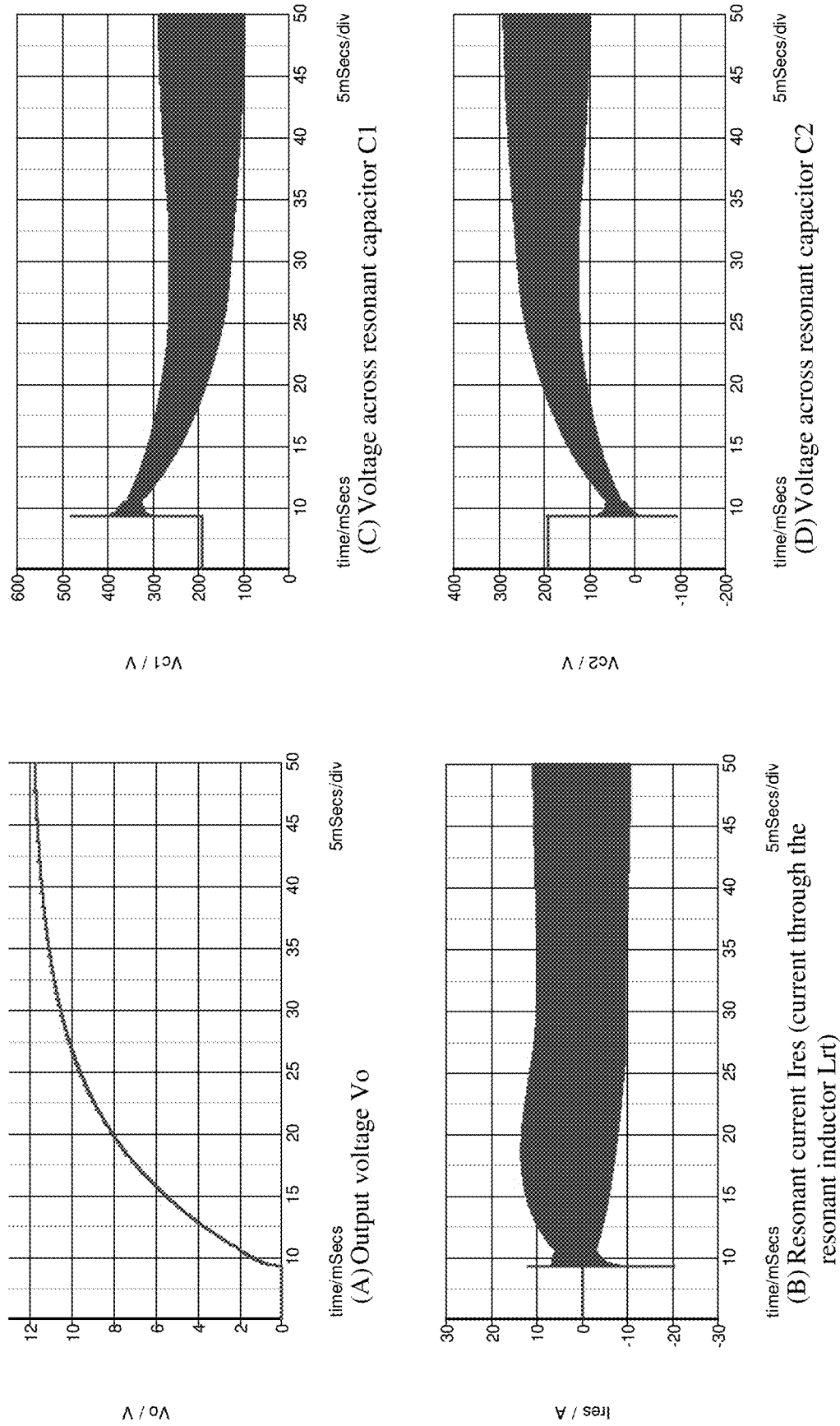
FIGS. 3A-3D show waveforms during soft start using high-side PWM without bleed resistor R.
Figure 4:
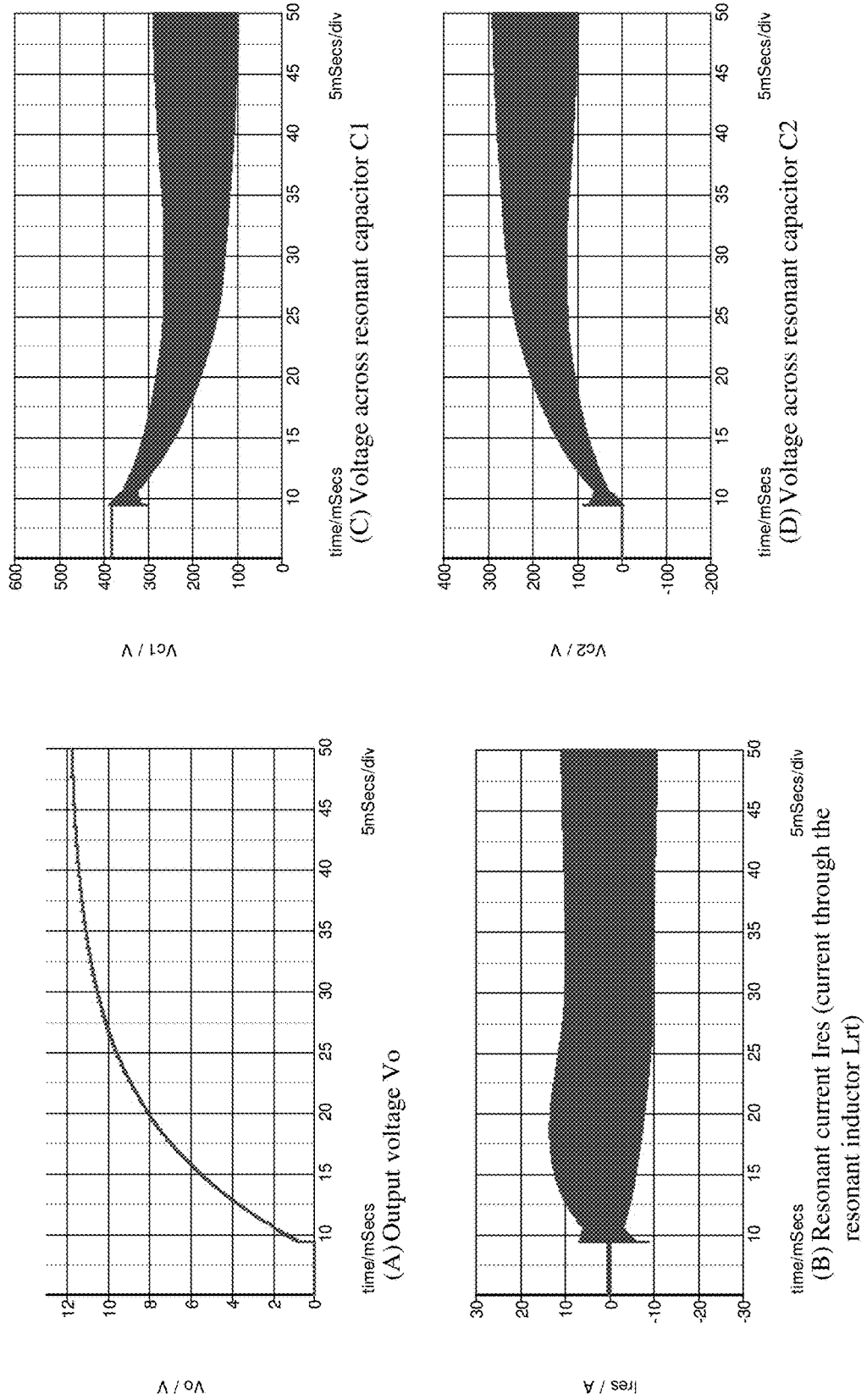
FIGS. 4A-4D show waveforms during soft start using high-side PWM with bleed resistor R.

FIGS. 3A-3D are graphs of simulated voltage and current measurements for high-side PWM control of the LLC resonant converter of FIG. 2 without the bleed resistor R, and FIGS. 4A-4D are graphs of simulated voltage and current measurements for high-side PWM control of the LLC resonant converter of FIG. 2 with the bleed resistor R. As shown in the graph of FIG. 3B without the bleed resistor R, the resonant current Ires through the resonant inductor Lrt, Lre exhibits a large inrush current spike during startup of the resonant converter. Further, this large inrush current also results in a high-voltage spike across the high-side resonant capacitor C1, as shown in the graph of FIG. 3C.

As seen in FIGS. 4A-4D with the bleed resistor R, both the inrush current and the initial voltage spike across the high-side resonant capacitor C1 are significantly reduced, which reduces stress on the components of the resonant converter.

Another benefit of this control scheme is that the low-side switch Q2 is turned on at zero voltage. Thus, zero-voltage switching (ZVS) losses only occur in the high-side switch Q1 during startup of the resonant converter. Accordingly, switching noise is reduced as compared with a conventional PWM scheme.

Implementation of the control scheme is relatively simple because high-voltage half-bridge gate drivers can be used to drive the gate terminals of the high-side switch Q1 and the low-side switch Q2 to eliminate the need for bulky pulse transformers used in conventional resonant converters.

Figure 12:
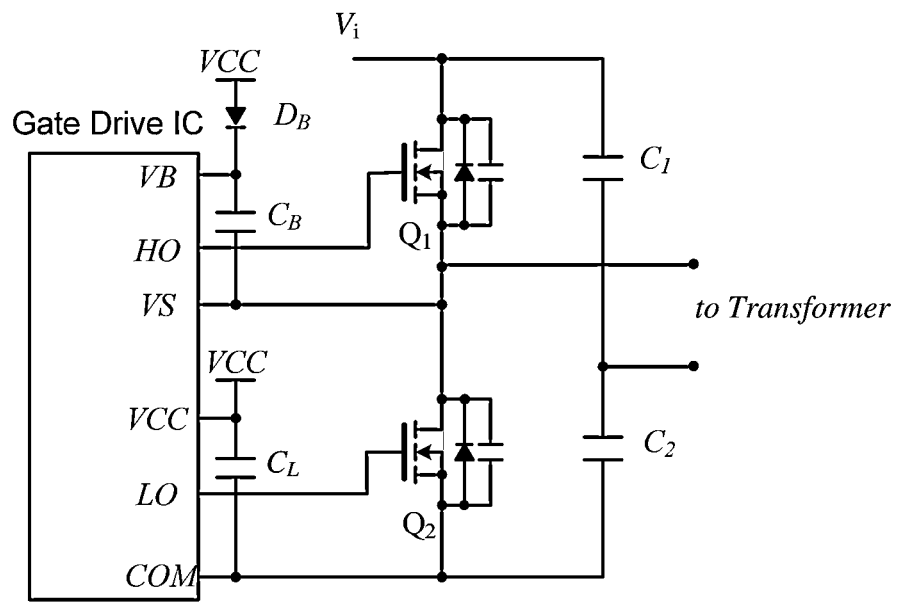
FIG. 12 is a circuit diagram of half-bridge gate drive using a capacitive bootstrap.

A commercial high-voltage half-bridge Gate Drive IC, which acts as buffer for the gate drive signals provided by a controller IC, is able to drive the high-side switch Q1 because of the use of a capacitive bootstrap, an example of which is shown in FIG. 12. The high-voltage half-bridge Gate Drive IC typically includes the following terminals: high-side power supply VB, high-side output HO, high-side ground or voltage offset VS, low-side power supply VCC, low-side output LO, and low-side ground COM. The low-side switch Q2 preferably is turned on with an appropriate minimum time interval to properly charge the bootstrap capacitor CB for the high-side gate driver power supply. The bootstrap capacitor CB is connected to the low-side power supply VCC, which is typically supplied by an auxiliary power supply at about 12 volts, through diode DB, which prevents the high voltage from the input voltage Vi from damaging the low-side power supply VCC. By using this arrangement, the low-side switch Q2 turns on with a full duty cycle, which allows the bootstrap capacitor CB for the high-side gate driver power supply to be fully charged at every cycle. As shown in FIG. 12, a low-side buffer capacitor CL provides a low-side output voltage buffer and recharges the bootstrap capacitor CB. The capacitance of the low-side buffer capacitor CL is preferably about ten times the capacitance of the bootstrap capacitor CB.

For high-side gate drive using a capacitive bootstrap, the low-side switch Q2 preferably turns on prior to the high-side switch Q1 to pre-charge the bootstrap capacitor CB. This arrangement charges the low-side resonant capacitor C2 and discharges the high-side resonant capacitor C1 to some extent. Thus, the voltage across the high-side resonant capacitor C1 increases before the high-side switch Q1 turns on, which results in larger inrush current. Reducing the capacitance of the bootstrap capacitor reduces the inrush current caused by the voltage across the high-side resonant capacitor C1 increasing before the high-side switch Q1 turns on. However, the capacitance of the bootstrap capacitor should be carefully selected to ensure reliable operation of the gate driver.

Figure 5:
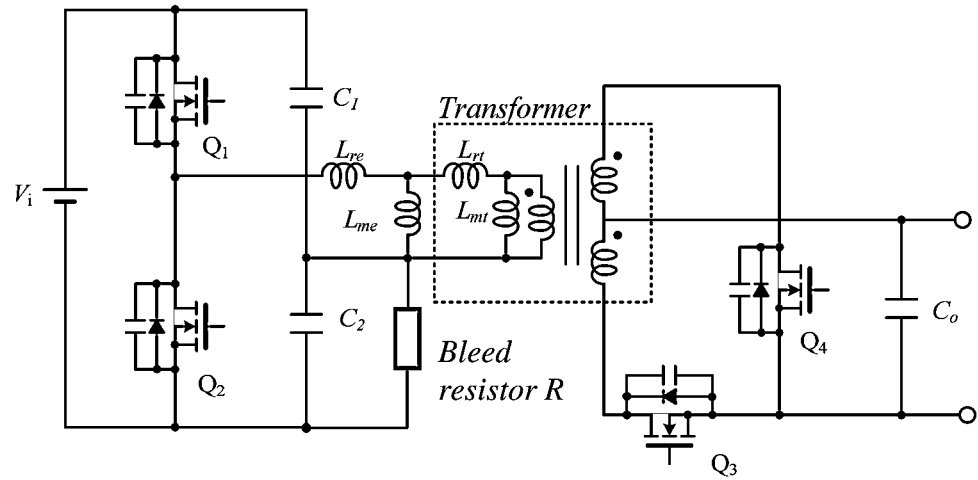
FIG. 5 is a circuit diagram of a converter with a bleed resistor R connected in parallel with low-side resonant capacitor C2 for high-side PWM.
Figure 6:
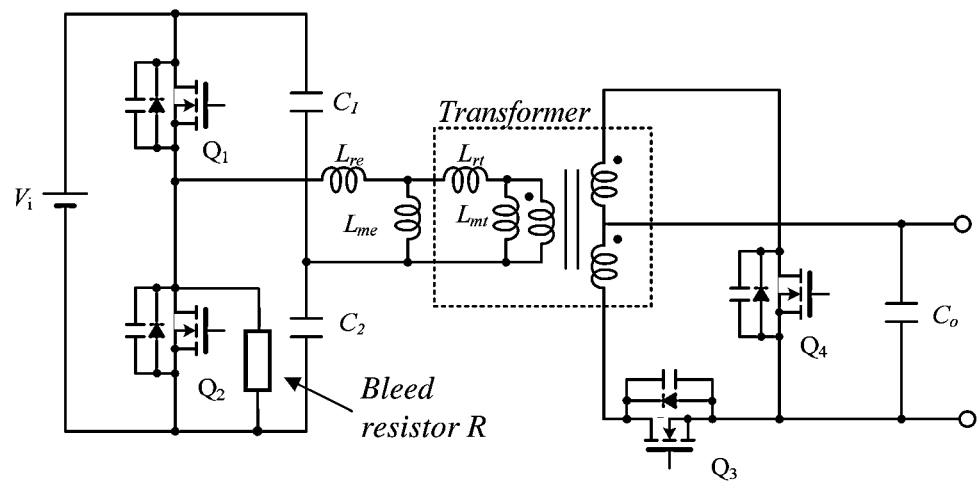
FIG. 6 is a circuit diagram of a converter with a bleed resistor R connected in parallel with low-side switch $Q_2$ for high-side PWM.

According to a preferred embodiment of the present invention, high-side PWM control is used in a resonant converter that includes the bleed resistor R connected in parallel with the low-side switch Q2 as shown in FIG. 6. According to another preferred embodiment of the present invention, the bleed resistor R is connected in parallel with the low-side resonant capacitor C2, as shown in FIG. 5. The bleed resistor R is preferably connected to the low-side resonant capacitor C2 because it will have less effect during normal operation. Further, the effect during normal operation can be reduced by properly selecting the bleed resistor R.

Figure 7A:
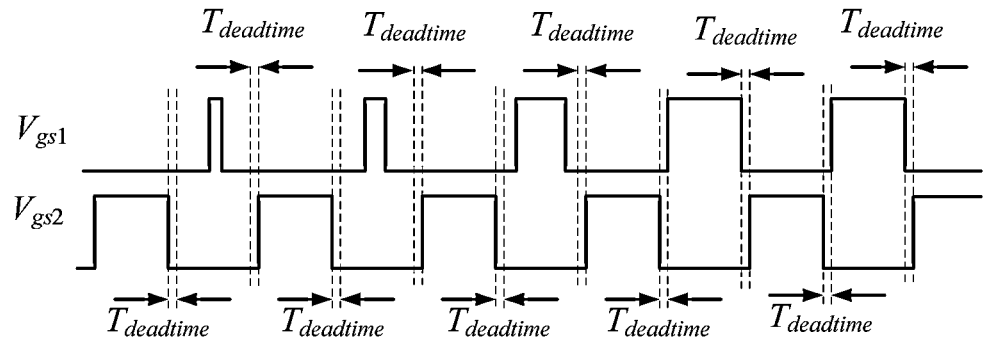
FIG. 7A-7C show gate drive signals with variable duty cycle control for high-side switch $Q_1$ only.
Figure 7B:
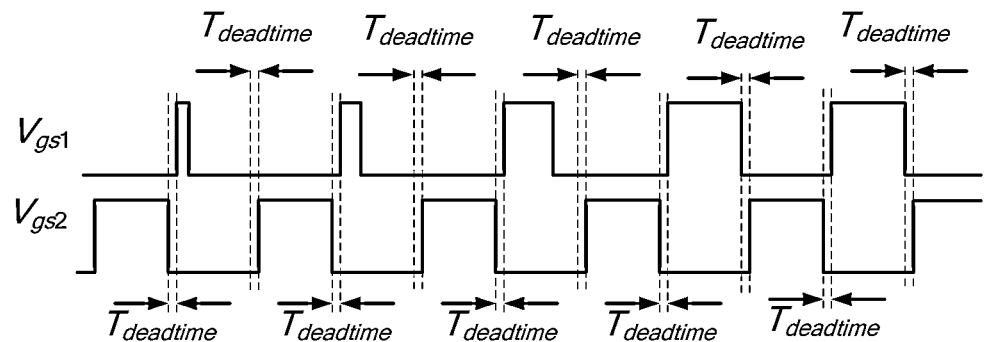
Figure 7C:
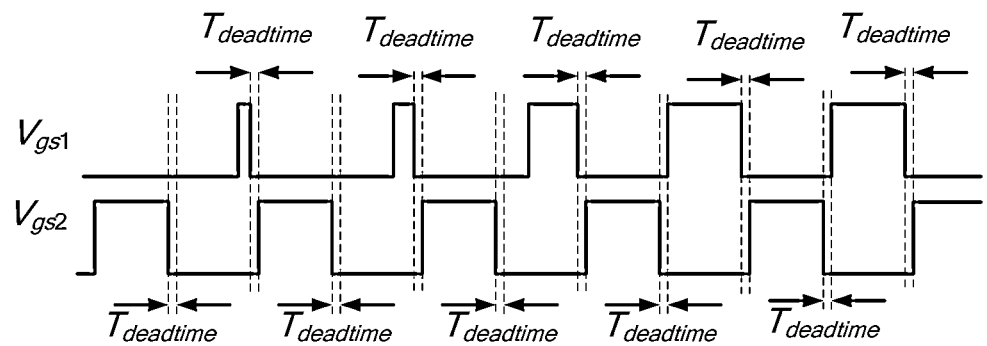

During startup of the resonant converters shown in FIGS. 5 and 6, the high-side switch Q1 is controlled with a variable duty cycle, while the low-side switch Q2 operates with a full duty cycle. FIGS. 7A-7C show gate drive waveforms for the resonant converters of FIGS. 5 and 6. A high-side gate drive signal Vgs1 for the high-side switch Q1 and a low-side gate drive signal Vgs2 for the low-side switch Q2 can be center-aligned as shown in FIG. 7A, left-aligned as shown in FIG. 7B, or right-aligned as shown in FIG. 7C. Preferably, the gate drive signals are right-aligned to provide ZVS for the low-side switch Q2.

The resonant converters shown in FIGS. 5 and 6 and the gate drive signals shown in FIGS. 7A-7C reduce the inrush current and the initial voltage spike across the high-side resonant capacitor C1 so as to reduce stress on the components of the resonant converter.

Figure 8:
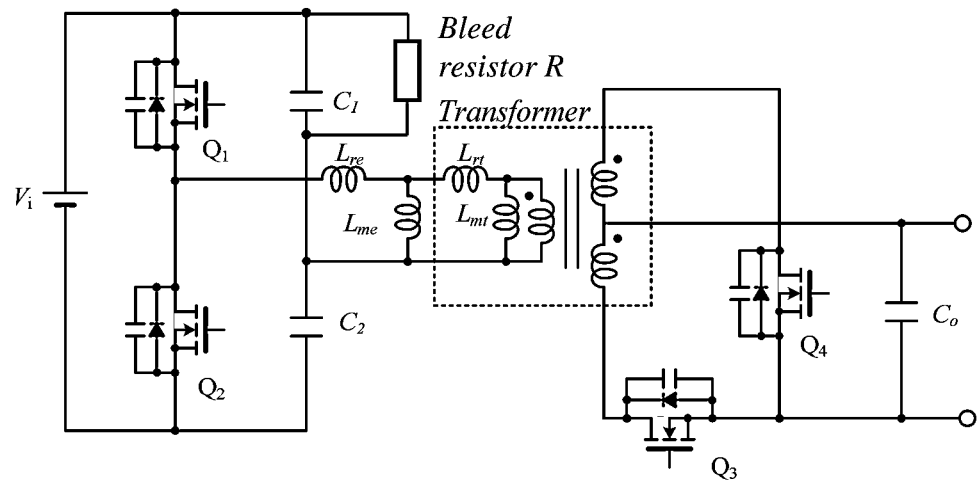
FIG. 8 is a circuit diagram of a converter with a bleed resistor R connected in parallel with high-side resonant capacitor C1 for low-side PWM.
Figure 9:
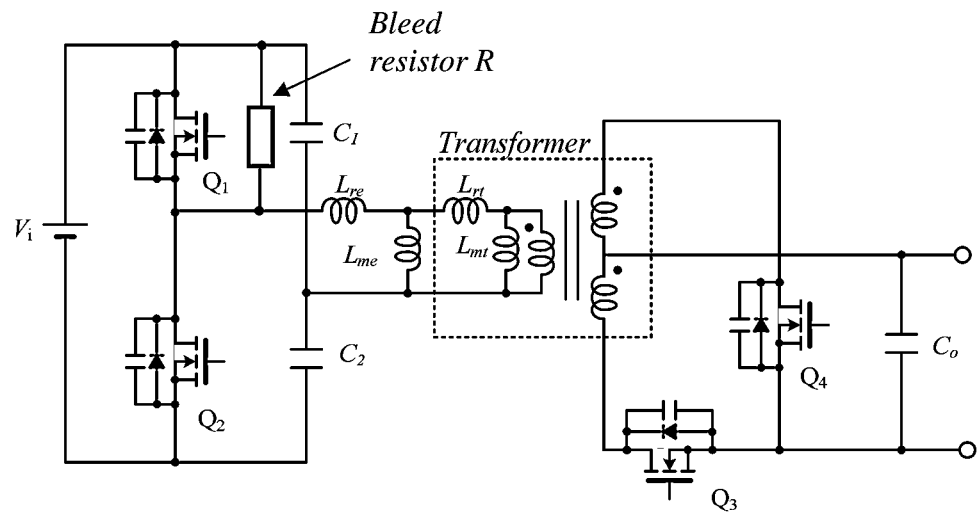
FIG. 9 is a circuit diagram of a converter with a bleed resistor R connected in parallel with high-side switch $Q_1$ for low-side PWM.

According to a preferred embodiment of the present invention, low-side PWM control is used in a resonant converter that includes the bleed resistor R connected in parallel with the high-side switch Q1, as shown in FIG. 9. According to another preferred embodiment of the present invention, the bleed resistor R is connected in parallel with the high-side resonant capacitor C1, as shown in FIG. 8. The bleed resistor R is preferably connected to the high-side resonant capacitor C1 because it will have less effect during normal operation. Further, the effect during normal operation can be reduced by properly selecting the bleed resistor R.

Figure 10A:
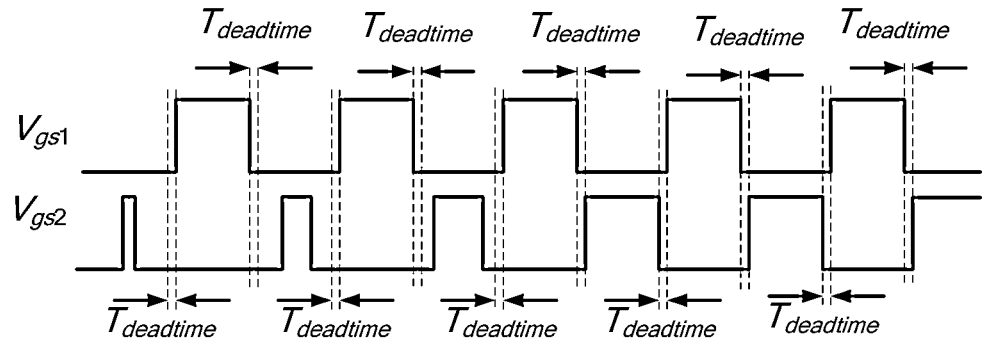
FIGS. 10A-10C show gate drive signals with variable duty cycle control for low-side switch $Q_2$ only.
Figure 10B:
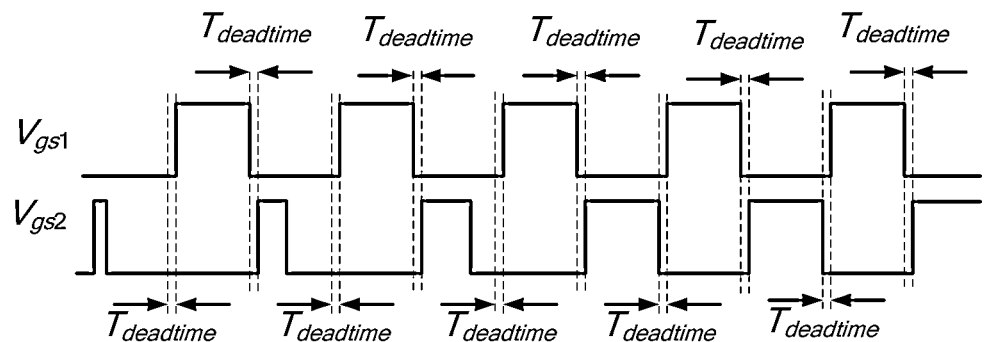
Figure 10C:
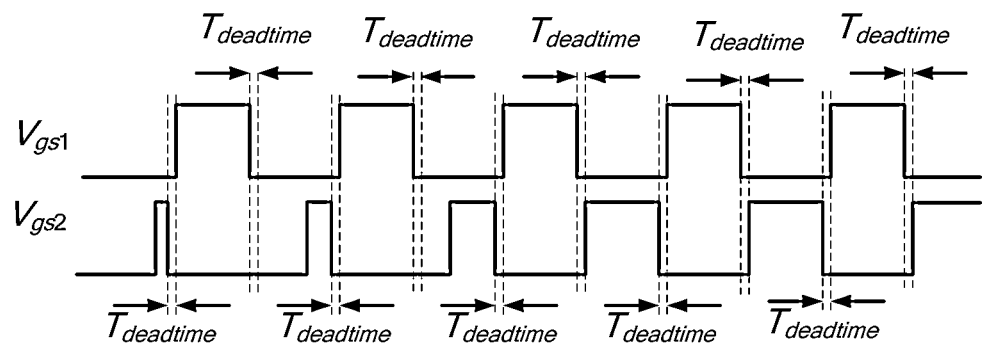

During startup of the resonant converters shown in FIGS. 8 and 9, the low-side switch Q2 is controlled with a variable duty cycle while the high-side switch Q1 operates with a full duty cycle. FIGS. 10A-10C are gate drive waveforms for the resonant converters of FIGS. 8 and 9. A high-side gate drive signal Vgs1 for the high-side switch Q1 and a low-side gate drive signal Vgs2 for the low-side switch Q2 can be center-aligned as shown in FIG. 10A, left-aligned as shown in FIG. 10B, or right-aligned as shown in FIG. 10C. Preferably, the gate drive signals are right-aligned to provide ZVS for high-side switch Q1.

The resonant converters shown in FIGS. 8 and 9 and the gate drive signals shown in FIGS. 10A-10C reduce the inrush current and the initial voltage spike across the high-side resonant capacitor C2 so as to reduce stress on the components of the resonant converter.

Accordingly, the resonant converters shown in FIGS. 5, 6, 8, and 9 can be easily implemented using commercially available control ICs for LLC resonant converters with high-side gate drive capability using a capacitive bootstrap, an example of which is shown in FIG. 12 and described above. Because commercially available control ICs for LLC resonant converters can only operate at frequency modulation mode, the duty cycles of the high-side switch Q1 and the low-side switch Q2 are not directly controllable. However, low-side PWM control can be easily implemented by adding a simple external circuit to selectively filter out a portion of each of the pulses included in low-side gate drive signals output by the control IC to provide the low-side gate drive signal Vgs2. High-side PWM control is difficult to implement with commercially available control ICs for LLC resonant converters because isolation between the circuit that provides pulse blanking (i.e., filtering or zeroing out a portion of each of the voltage pulses in the low-side gate drive signal Vgs2) and the circuit that generates the high-side gate drive signal should be considered. In particular, a bulky pulse transformer can be required. Thus, low-side PWM control provides an easier implementation of soft startup in a resonant converter when commercially available control ICs for LLC resonant converters are used.

The bleed resistor R, when connected in parallel with the high-side switch Q1 or the high-side resonant capacitor C1, can pre-discharge the high-side resonant capacitor C1 such that the voltage across the high-side resonant capacitor C1 is nearly zero before startup of the resonant converter. When the high-side switch Q1 is turned on with full duty cycle at startup, no large inrush current spike is generated because the voltage across the resonant inductor Lrt, Lre is small because of the small initial voltage on the high-side resonant capacitor C1. The low-side PWM control can achieve similar soft-start performance as that of the high-side PWM control described above. Thus, by properly setting initial conditions before the startup of the resonant converter, inrush current can be avoided.

For a high-side gate drive using a capacitive bootstrap, the low-side switch Q2 preferably turns on prior to the high-side switch Q1 to pre-charge the bootstrap capacitor CB. This arrangement charges the low-side resonant capacitor C2 and discharges the high-side resonant capacitor C1 to some extent. Thus, the voltage across the high-side resonant capacitor C1 increases before the high-side switch Q1 turns on, which results in larger inrush current. Reducing the capacitance of the bootstrap capacitor can reduce the inrush current caused by the voltage across the high-side resonant capacitor C1 increasing before the high-side switch Q1 turns on. However, the capacitance of the bootstrap capacitor should be carefully selected to ensure reliable operation of the gate driver.

Other devices or circuits can be added to a resonant converter to achieve similar results as those achieved with the bleed resistor R. For example, a transistor or switch can be used in place of the bleed resistor R to selectively charge or discharge the high-side resonant capacitor C1 or the low-side resonant capacitor C2. For example, before startup, the transistor or switch can be turned on to discharge the high-side resonant capacitor C1 or the low-side resonant capacitor C2, and then the transistor or switch can be turned off so that the converter can startup.

Figure 11:
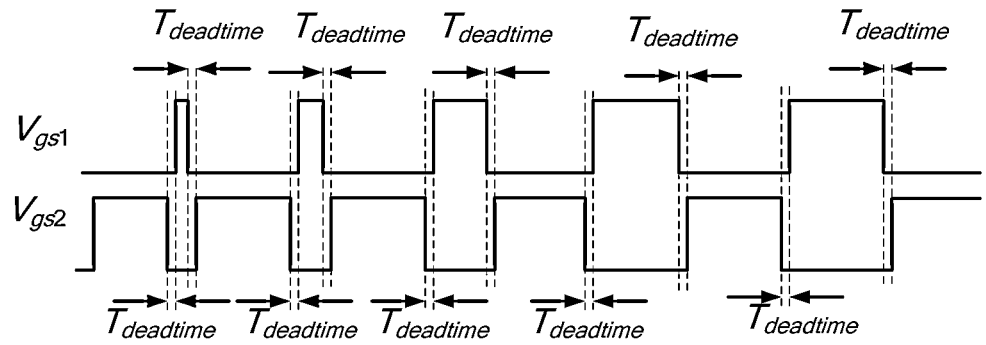
FIG. 11 shows gate drive signals with asymmetrical PWM.

Asymmetrical PWM control can be used in the resonant converters described above and controlled in a similar manner as high-side PWM control and low-side PWM control described in the preferred embodiments of the present invention. FIG. 11 shows gate drive waveforms for asymmetrical PWM control, including a high-side gate drive signal Vgs1 for the high-side switch Q1 and a low-side gate drive signal Vgs2 for the low-side switch Q2. If the high-side gate drive signal Vgs1 initially has a wider pulse width than the low-side gate drive signal Vgs2, the bleed resistor R is preferably connected in parallel with the high-side switch Q1 or the high-side resonant capacitor C1. However, if the low-side gate drive signal Vgs2 initially has a wider pulse width than the high-side gate drive signal Vgs1, the bleed resistor R is preferably connected in parallel with the low-side switch Q2 or the low-side resonant capacitor C2.

The preferred embodiments of the present invention are described above with respect to analog circuits. However, the preferred embodiments of the present invention can also be implemented with digital circuits. In particular, the control IC for the resonant converters can be a digital IC or an analog IC. Further, the preferred embodiments of the present invention can be applied to any type of DC-to-DC converter, including LLCLL resonant converters and LLC resonant converters.

If a single resonant capacitor is used instead of split resonant capacitors C1 and C2, then the bleed resistor R can be placed in parallel with the single resonant capacitor.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:
1. A converter with soft start comprising:
a transformer;
first and second switches connected to the transformer to supply power to the transformer;
first and second capacitors connected in series, the first capacitor is connected to the first switch and the second capacitor is connected to the second switch;
a controller connected to the first and second switches and arranged to, during startup of the converter, switch the first switch with a variable duty cycle and switch the second switch with either a fixed duty cycle or a variable duty cycle with pulses larger than pulses of the variable duty cycle of the first switch; and
a bleed device arranged to set initial conditions of the converter before startup of the converter by discharging the second capacitor before startup; wherein
the converter is an LLC converter; and
the first and the second capacitors are split resonant capacitors.
2. The converter of claim 1, wherein the bleed device is connected in parallel with the second switch.

3. The converter of claim 2, wherein:
the first switch is a high-side switch; and
the second switch is a low-side switch.

4. The converter of claim 2, wherein:
the first switch is a low-side switch; and
the second switch is a high-side switch.

5. The converter of claim 1, wherein the bleed device is connected in parallel with the second capacitor.

6. The converter of claim 5, wherein:
the first switch is a high-side switch;
the second switch is a low-side switch;
the first capacitor is a high-side capacitor; and
the second capacitor is a low-side capacitor.

7. The converter of claim 5, wherein:
the first switch is a low-side switch;
the second switch is a high-side switch;
the first capacitor is a low-side capacitor; and
the second capacitor is a high-side capacitor.

8. The converter of claim 1, wherein the bleed device discharges the second capacitor before startup to zero or nearly zero.

9. The converter of claim 1, further comprising a resonant inductor.

10. The converter of claim 9, wherein the resonant inductor is a discrete inductor or a leakage inductance of the transformer.

11. The converter of claim 1, wherein the bleed device includes a resistor.

12. The converter of claim 1, wherein the bleed device includes a switch.

13. The converter of claim 1, wherein switching of the first switch is center-aligned, left-aligned, or right-aligned.

14. A soft-start method for a converter comprising the steps of:
providing a converter that includes:
a transformer;
first and second switches connected to the transformer to supply power to the transformer; and
first and second capacitors connected in series, the first capacitor is connected to the first switch and the second capacitor is connected to the second switch;
before startup of the converter, using a bleed device to set initial conditions of the converter by discharging the second capacitor before startup; and
during startup of the converter, switching the first switch with a variable duty cycle and switching the second switch with either a fixed duty cycle or a variable duty cycle with pulses larger than pulses of the variable duty cycle of the first switch; wherein
the converter is an LLC converter; and
the first and the second capacitors are split resonant capacitors.

15. The soft-start method of claim 14, wherein the bleed device is connected in parallel with the second switch.

16. The soft-start method of claim 14, wherein discharging of the second capacitor before startup discharges the second capacitor to zero or nearly zero.

17. A converter with soft start comprising: a transformer including primary and secondary windings; a primary circuit connected to the primary windings and including:
first and second switches connected to the transformer to supply power to the transformer; and
first and second capacitors connected in series, the first capacitor is connected to the first switch and the second capacitor is connected to the second switch;
a controller connected to the first and second switches and arranged to, during startup of the converter, switch the first switch with a variable duty cycle and switch the second switch with either a fixed duty cycle or a variable duty cycle with pulses larger than pulses of the variable duty cycle of the first switch; and
a bleed device arranged to set initial conditions of the converter before startup of the converter by discharging the second capacitor before startup; and a secondary circuit connected to the secondary windings and not including an inductor; wherein the converter is an LLC converter; and the first and second capacitors are split resonant capacitors.

\* \* \* \* \*